US009839319B2

(12) United States Patent
Jacobsen et al.

(10) Patent No.: US 9,839,319 B2
(45) Date of Patent: Dec. 12, 2017

(54) ADAPTER FOR OFFSET STACKING OF BEVERAGE DECANTERS

(71) Applicant: Newco Enterprises, Inc., St. Charles, MO (US)

(72) Inventors: Jody G. Jacobsen, Defiane, MO (US); David L. Brandsma, St. Charles, MO (US); Joseph P. Webster, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 0 days.

(21) Appl. No.: 14/846,183

(22) Filed: Sep. 4, 2015

(65) Prior Publication Data

US 2016/0068305 A1    Mar. 10, 2016

Related U.S. Application Data

(60) Provisional application No. 62/045,943, filed on Sep. 4, 2014.

(51) Int. Cl.
| | |
|---|---|
| *A47J 31/46* | (2006.01) |
| *B65D 21/02* | (2006.01) |
| *B65D 21/00* | (2006.01) |

(52) U.S. Cl.
CPC ........ *A47J 31/467* (2013.01); *B65D 21/0209* (2013.01); *B65D 21/0235* (2013.01); *B65D 21/00* (2013.01); *B65D 21/02* (2013.01); *B65D 21/023* (2013.01)

(58) Field of Classification Search
CPC ........ A47J 31/46; A47J 31/462; A47J 31/467; B65D 21/0204; B65D 21/023; B65D 43/12; B65D 43/20; B65D 5/001; B65D 21/00; B65D 21/02; B65D 21/0209; B65D 21/0235

See application file for complete search history.

(56) References Cited

U.S. PATENT DOCUMENTS

| | | | | | |
|---|---|---|---|---|---|
| 2,582,421 | A | * | 1/1952 | Essman | B65D 21/0209 312/201 |
| 2,957,601 | A | * | 10/1960 | Novick | B65D 21/0224 206/503 |
| 3,281,006 | A | * | 10/1966 | Wei | A47J 27/13 220/345.5 |
| 3,379,339 | A | * | 4/1968 | Asenbauer | B65D 21/046 206/506 |
| 3,782,602 | A | * | 1/1974 | Page | B65D 21/0219 206/509 |
| 5,163,587 | A | * | 11/1992 | Apps | B65D 21/0212 206/505 |

(Continued)

*Primary Examiner* — Frederick C Nicolas
*Assistant Examiner* — Bob Zadeh
(74) *Attorney, Agent, or Firm* — Matthews Edwards LLC

(57) ABSTRACT

An adapter for offset stacking of beverage decanters or dispensers in laterally offset relation, and more particularly, configurable for stacking the decanters in a forwardly and/or sidewardly arranged laterally offset relation, to allow dispensing individually from faucets, spigots, or other dispensing apparatus of the decanters without dripping directly onto lower faucets and without interference, and which can also serve as a decanter lid. The adapter can be configured for fore and aft, angular, and/or sideward offsets, and can include pass-through openings for brewing, and other optional features.

25 Claims, 6 Drawing Sheets

(56) References Cited

U.S. PATENT DOCUMENTS

| | | | | |
|---|---|---|---|---|
| 5,535,908 A * | 7/1996 | Sheu | ............... | B65D 81/3205 |
| | | | | 206/509 |
| 5,586,656 A * | 12/1996 | Abrums | ............ | B65D 21/0233 |
| | | | | 206/501 |
| 5,967,322 A * | 10/1999 | Apps | ................ | B65D 21/064 |
| | | | | 206/497 |
| 7,048,150 B2 * | 5/2006 | Barnett | ............. | B65D 25/465 |
| | | | | 222/143 |
| 7,128,230 B2 * | 10/2006 | Jacobson | ............ | A47J 31/50 |
| | | | | 206/508 |
| 2012/0325866 A1 * | 12/2012 | Lee | ..................... | B65D 25/42 |
| | | | | 222/466 |
| 2016/0068305 A1 * | 3/2016 | Jacobsen | ............ | A47J 31/467 |
| | | | | 206/509 |

* cited by examiner

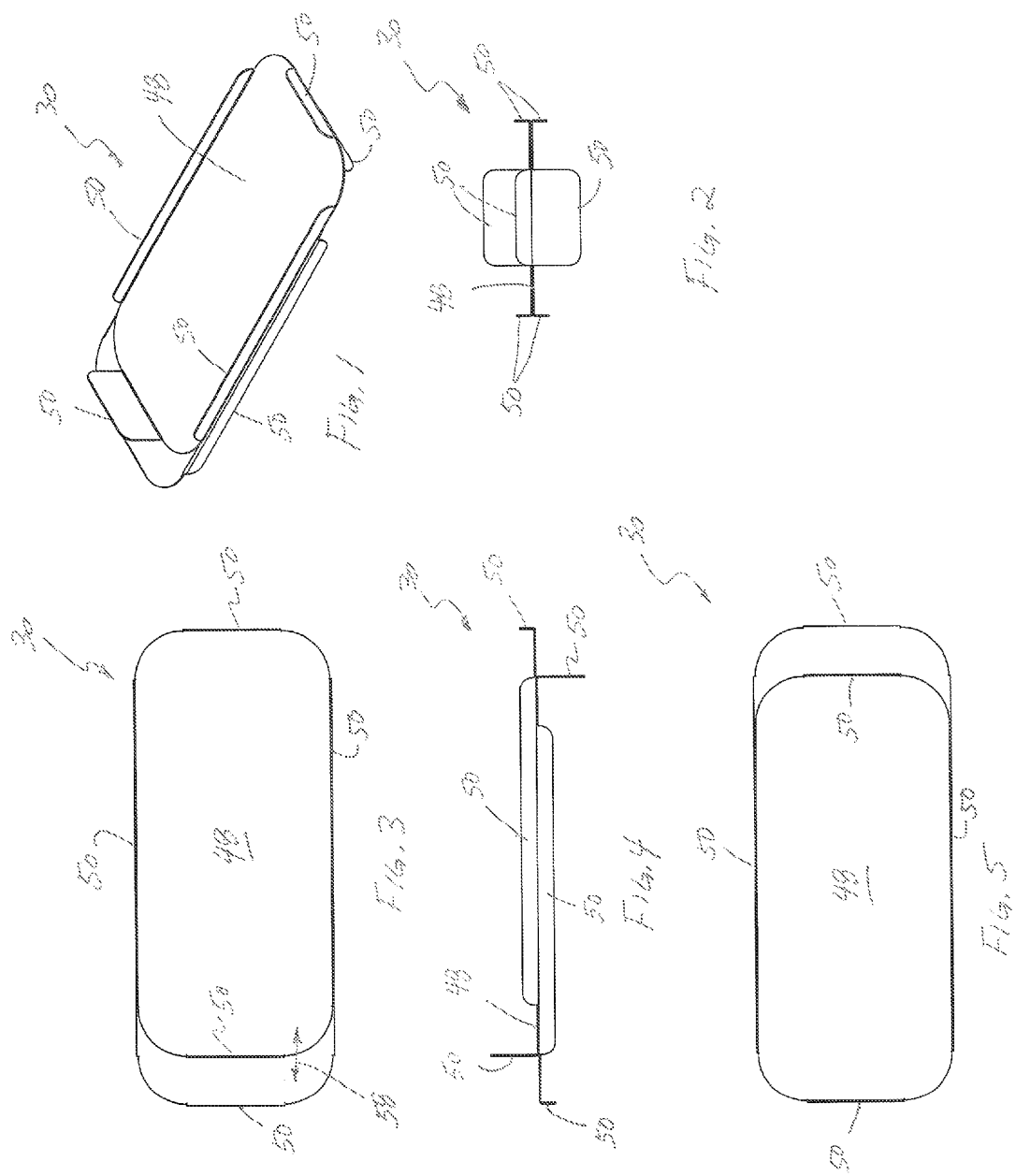

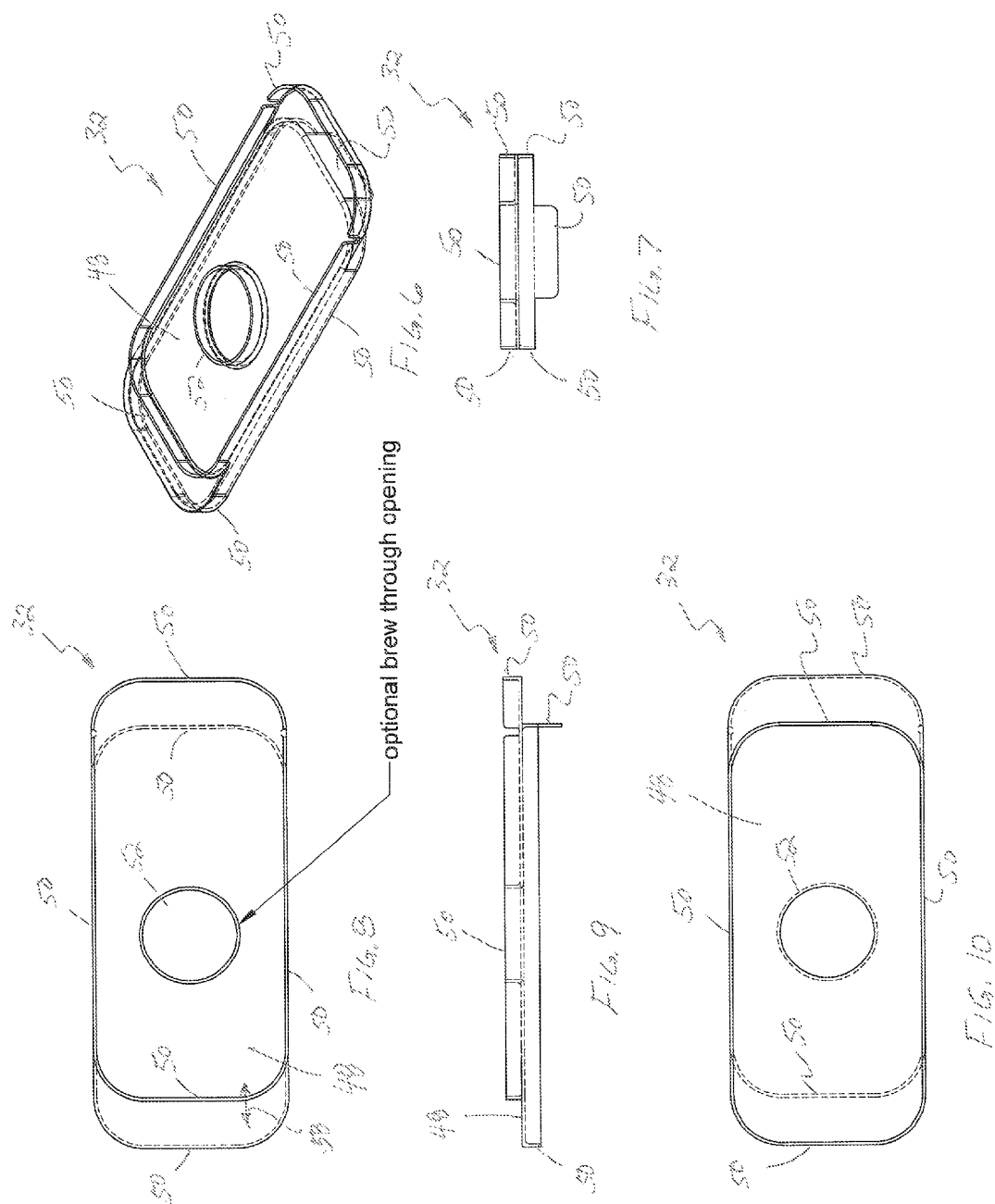

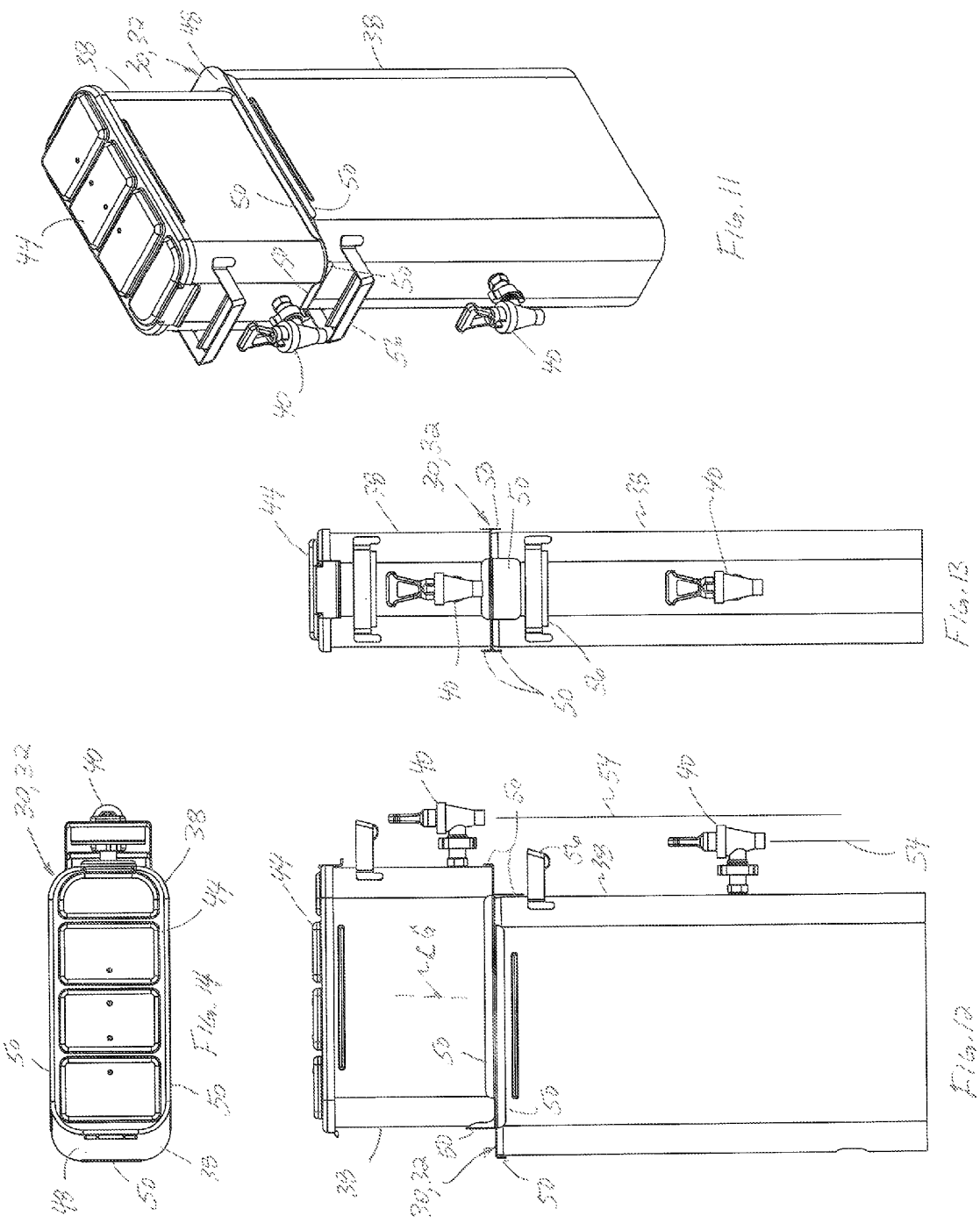

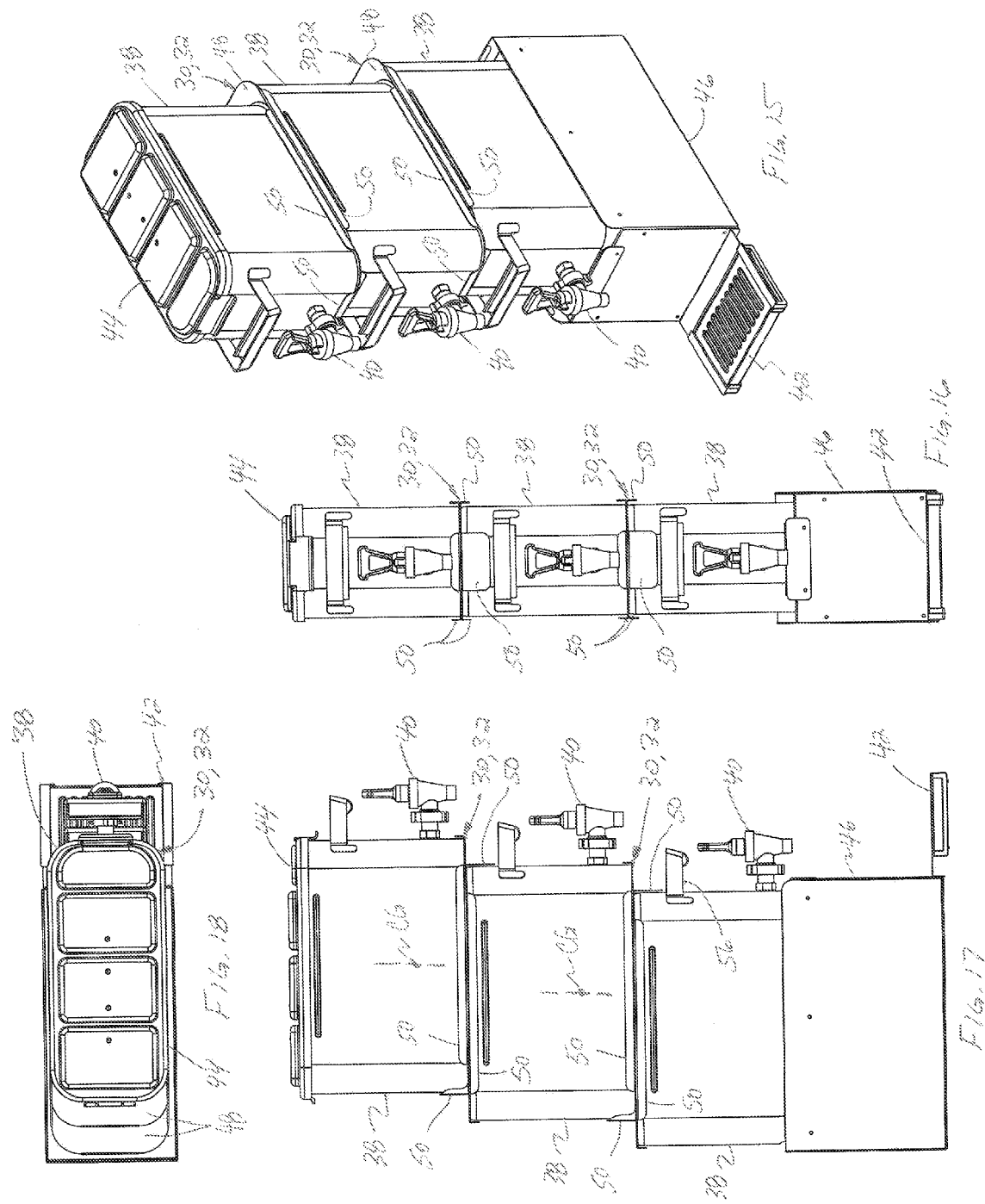

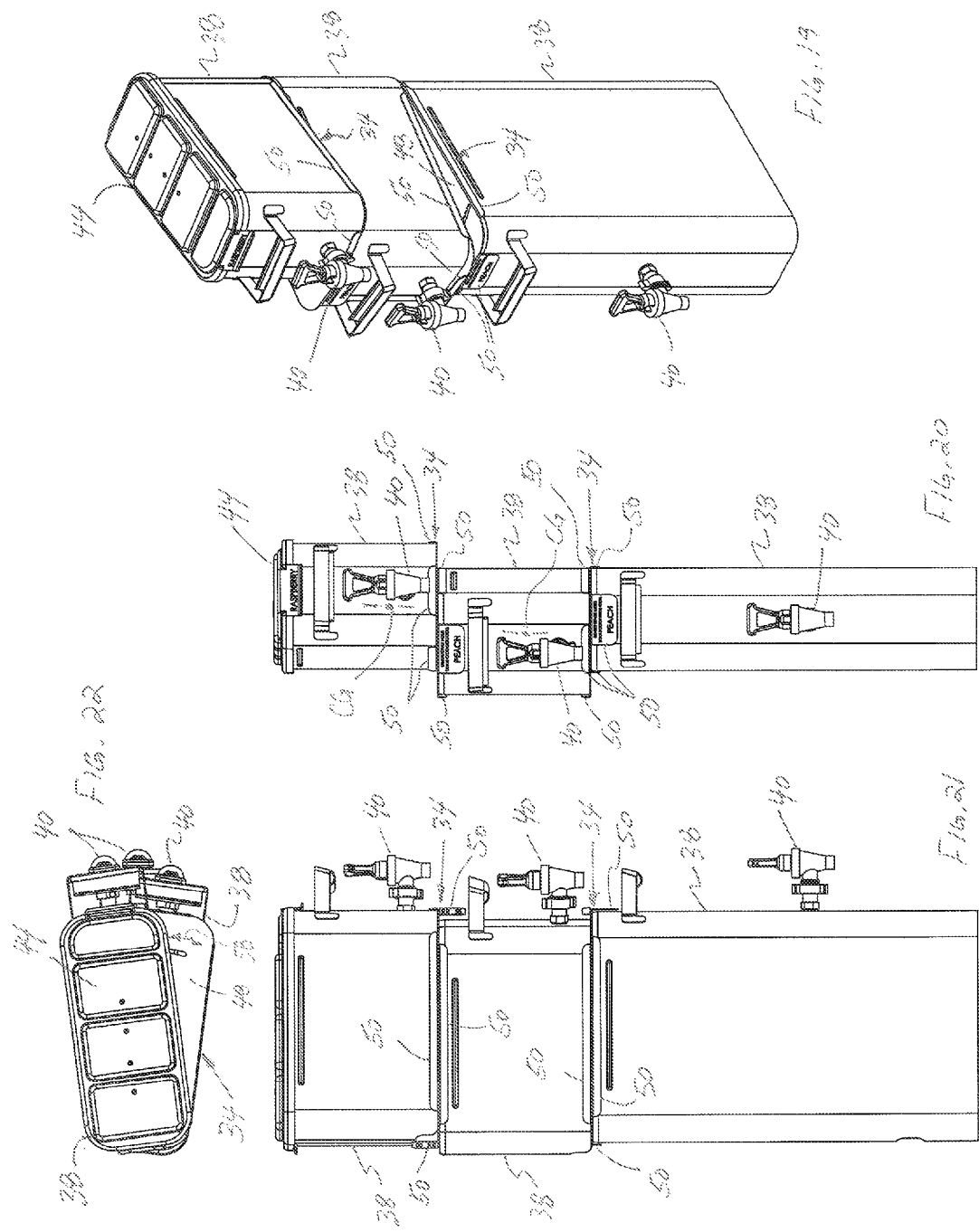

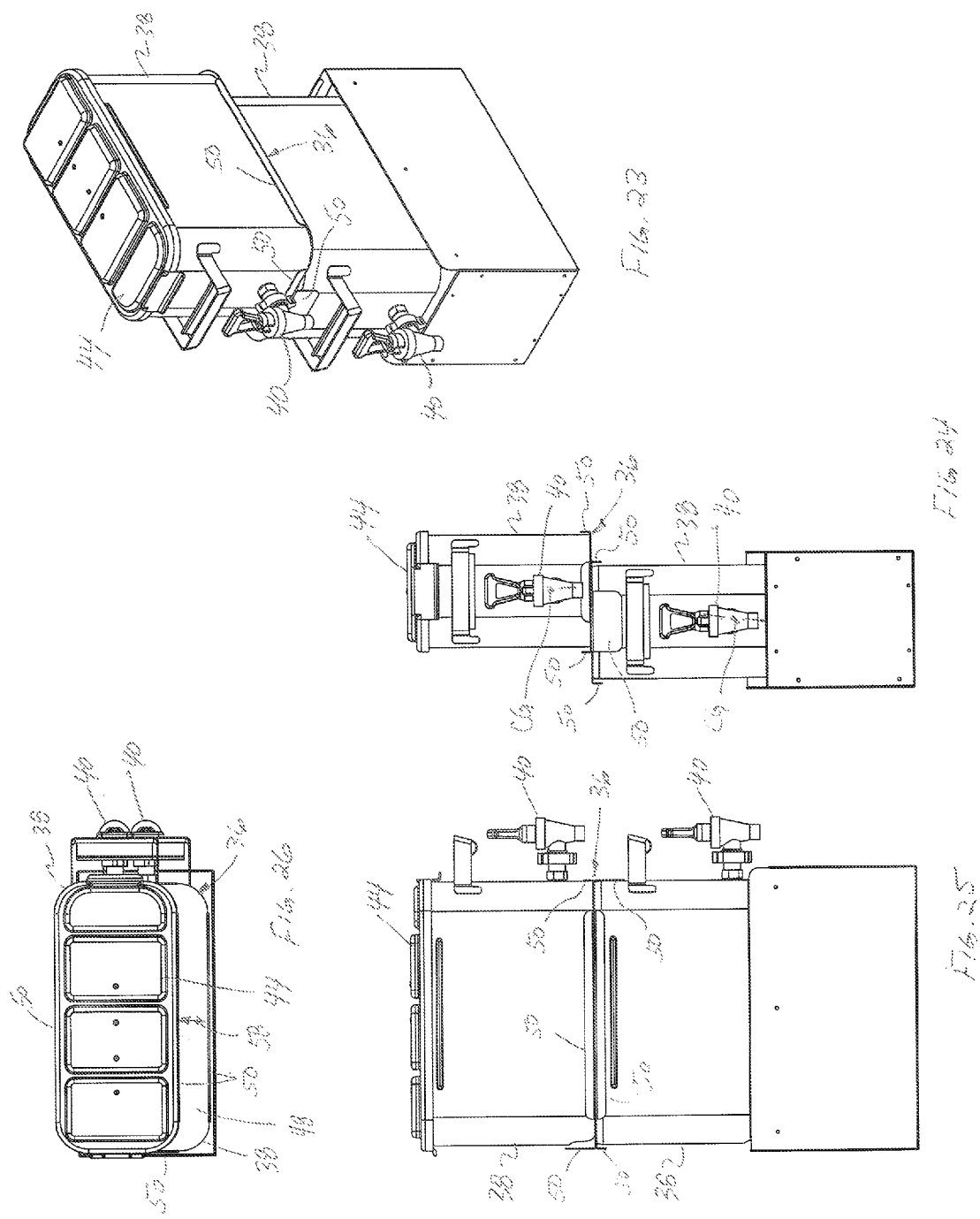

US 9,839,319 B2

ADAPTER FOR OFFSET STACKING OF BEVERAGE DECANTERS

This application claims the benefit of U.S. Provisional Application No. 62/045,943, filed Sep. 4, 2014.

TECHNICAL FIELD

This invention relates generally to an adapter for offset stacking of beverage decanters or dispensers in laterally offset relation, and more particularly, configurable for stacking the decanters in a forwardly and/or sidewardly arranged laterally offset relation, to allow dispensing individually from faucets, spigots, or other dispensing apparatus of the decanters without dripping directly onto lower faucets and without interference, and which can also serve as a decanter lid.

BACKGROUND ART

The disclosure of U.S. Provisional Application No. 62/045,943, filed Sep. 4, 2014, is hereby incorporated herein in its entirety by reference.

It is well known to stack decanters, dispensers, and other vessels (hereinafter sometimes referred to collectively herein as decanters) for holding beverages such as tea, coffee, hot chocolate, juice, and the like. It is also well known to provide apparatus to allow stacking the decanters in vertically aligned relation. Additionally, apparatus are known to allow vertically stacking the decanters with faucets or other dispensing valves in sidewardly offset relation, that is, with one or more of the faucets or valves offset sidewardly from another one or more of the faucets. Reference in this regard, Jacobson et al. U.S. Pat. No. 7,128,230 B2, directed to a Beverage Decanter Adapter and Lid that allows stacking decanters in vertically aligned or coaxial relation. However, a shortcoming that has been observed is that the faucet or faucets of the upper decanter or decanters can drip onto the faucet or faucets of the lower decanter or decanters soiling them. This is a significant problem when the upper decanter contains a sugary drink such as sweet tea presently popular in the U.S., as the residue becomes sticky on the lower faucet, so as to be unsanitary to use and attracts dirt. It is possible to rotate the stacked decanters when using the adapter of U.S. Pat. No. 7,128,230 B2, about their common axis, but only if the decanters are cylindrical. Presently, a large number of decanters in commercial use are of a generally rectangular shape (when viewed from above or below, and the adapter of U.S. Pat. No. 7,128,230 B2 provides no manner of relatively rotating stacked decanters of that shape.

Shelving racks allowing vertically arranging beverage decanters are also known. However, they are expensive, and mainly still align the faucets of the upper and lower decanters so as to have the above referenced shortcoming.

Thus, what is sought is apparatus for stacking beverage decanters, particularly, but not limited to those having a rectangular shape, that allows easily and inexpensively offsetting the faucets to avoid one or more of the shortcomings set forth above.

SUMMARY OF THE INVENTION

What is disclosed is apparatus for stacking beverage decanters, particularly, but not limited to those having a generally rectangular shape, that allows easily and inexpensively offsetting the faucets to avoid one or more of the shortcomings set forth above.

According to a preferred aspect of the invention an adapter for offset stacking of beverage decanters or dispensers in laterally offset relation is disclosed, so that respective upper and lower faucets of the decanters are offset in predetermined relation to each other to prevent dripping of matter from the faucet or other beverage dispensing valve or apparatus of an upper one or ones of the decanters, onto the faucet or other dispenser of a lower one or ones of the decanters, and also so the upper and lower decanters are stacked in a stable manner not prone to tipping.

The adapter of the invention can be configured for use with decanters of a variety of overall shapes when viewed from above, including, but not limited to, generally rectangular, polygonal, oval, round, and the like, and of any desired height, and can optionally function as a lid for a decanter.

As a preferred aspect of the invention, the adapter is a generally flat panel having downwardly projecting tabs and upwardly projecting tabs, arranged in respective patterns that bound and define spaces for receiving and containing an upper end of a lower decanter, and a lower end of an upper decanter, for capturing and holding the ends sufficiently for supporting the upper decanter without significant lateral movement or unintentional tipping. Selected ones of the upwardly projecting tabs are offset laterally by an extent or distance of offset from the downwardly projecting tabs, such that when the adapter is placed on the lower decanter and the upper decanter is placed on the adapter, the upper decanter will be held in the offset relation to the lower decanter. The extent of the offset will be sufficiently small to maintain a center of gravity of the upper decanter directly over a portion of the lower decanter for stability, while providing the desired offset of the respective faucets of the decanters. The respective tabs will have a vertical extent sufficient to prevent tipping of the upper decanter. The direction of offset can be fore/aft, angular, and/or sideward, as desired for a particular application.

BRIEF DESCRIPTION OF THE DRAWINGS

FIG. 1 is a perspective view of one embodiment of an adapter constructed and operable according to the invention;

FIG. 2 is an end view of the adapter of FIG. 1;

FIG. 3 is a top view of the adapter;

FIG. 4 is a side view of the adapter;

FIG. 5 is a bottom view of the adapter;

FIG. 6 is a perspective view of another embodiment of an adapter of the invention;

FIG. 7 is an end view of the adapter of FIG. 6;

FIG. 8 is a top view of the adapter;

FIG. 9 is a side view of the adapter;

FIG. 10 is a bottom view of the adapter;

FIG. 11 is a perspective view of decanters stacked in offset relation using an adapter according to the invention;

FIG. 12 is a side view of the stacked decanters of FIG. 11;

FIG. 13 is an end view of the stacked decanters;

FIG. 14 is a top view of the stacked decanters;

FIG. 15 is a perspective view of multiple decanters stacked in offset relation using multiple adapters according to the invention;

FIG. 16 is an end view of the multiple stacked decanters of FIG. 15;

FIG. 17 is a side view of the multiple stacked decanters;

FIG. 18 is a top view of the multiple stacked decanters;

FIG. 19 is a perspective view of multiple decanters stacked in an angularly offset manner using multiple adapters according to the invention;

FIG. 20 is an end view of the angularly offset stacked decanters of FIG. 19;

FIG. 21 is a side view of the angularly offset decanters;

FIG. 22 is a top view of the angularly offset decanters;

FIG. 23 is a perspective view of decanters stacked in a sidewardly offset manner using an adapter of the invention;

FIG. 24 is an end view of the sidewardly stacked decanters;

FIG. 25 is a side view of the sidewardly stacked decanters; and

FIG. 26 is a top view of the sidewardly stacked decanters.

DETAILED DESCRIPTION OF PREFERRED EMBODIMENTS OF THE INVENTION

As non-limiting representative embodiments of the invention, in FIGS. 1-5 a first adapter 30 is shown; in FIGS. 6-10 a second adapter 32 is shown, adapters 30 and 32 being configured for vertically stacking and offsetting the decanters in a fore or aft lateral direction. In FIGS. 11-18 adapters representative of either adapter 30, or adapter 32, are shown to illustrate interchangeably thereof. That is, adapters 30 or 32 can be used at the vertical interfaces between the stacked decanters. In FIGS. 19-22 a third adapter 34 for stacking decanters in an angular laterally offset relation is shown. And in FIGS. 23-26, a fourth adapter 36 for stacking decanters in sidewardly offset relation is shown. Adapters 30, 32, 34, and 36 can be manufactured from suitable materials, such as but not limited to, sheet metal or plastics, and/or molded plastics, as desired or required for a particular application.

The representative adapters 30, 32, 34, and 36 are shown configured for use with decanters 38 which are configured as having a generally rectangular profile shape (when viewed from above or below), but it should be understood that the adapters of the invention can alternatively be configured for use with decanters of a variety of different shapes, including, but not limited to, square and other polygonal shapes (with or without rounded corners), oval, round, and the like, as desired or required for a particular application.

Each decanter 38 basically comprises an enclosure having an interior cavity for containing a beverage to be dispensed, such as coffee, tea, etc., which can be cold or hot. Each decanter 38 has a bottom or lower end including an enclosing bottom pan or sheet, a surrounding upstanding wall, and may or may not be enclosed on the upper end. The decanter can be manufactured from metal, plastics, ceramics, and/or glass, or a combination thereof, in the well known manner. Each decanter 38 has a faucet 40 or other valve or apparatus operable for controllably dispensing the beverage to another container, such as a cup, mug, or the like, typically on a lower region of the wall or another suitable location, in the well known manner. At a suitable location or locations below the faucets 40, a drip pan 42 or pans 42 will preferably be disposed for catching drips of the beverage from the faucets 40, again in the well known manner. As a non-limiting example, the drip pan 42 is shown at the bottom of a base 46 on which a stack of decanters 38 is located, to provide a space below the lowest faucet 40 having a sufficient height for receiving a cup, mug, glass or other container into which the beverage will be dispensed. The upper decanters 38 shown each include an optional lid 44.

Adapters 30, 32, 34, and 36 as shown in various of the FIGS., can be of a suitably rigid sheet metal or plastics construction, and comprise a generally flat sheet or panel 48 preferably having an overall shape when viewed from above or below that will generally correspond to the combined shape of the decanters with which it will be used when the decanters are in a desired laterally offset relation, that is, when a desired portion of the upper stacked decanter overhangs an edge or edges of the lower decanter on which it is stacked to a desired extent. Panel 48 has a plurality of upwardly and downwardly projecting tabs 50 arranged in a pattern about its periphery, which can be either continuous or spaced apart, configured to abut, engage, or trap, the upper ends of the walls of the lower decanter, or comprising a lip or lips projecting upwardly therefrom, on the inside and/or outside thereof, in a manner such that adapter 30 will be fixed against significant lateral movement relative to the decanter, e.g., that can cause instability or allow tipping under normal circumstances.

Certain ones of the upwardly projecting tabs 50 are offset from the downwardly projecting tabs 50, by an extent corresponding to the desired extent of lateral offset or overhang of the stacked decanters. In the representative embodiment shown, tabs 50 are offset in a forward and rearward lateral direction for rectangular decanters having a faucet 40 on the forward walls or surfaces thereof (see FIGS. 11-18). Upwardly projecting tabs 50 are likewise configured in a pattern so as to abut, engage, or trap, the lower ends of the walls of the upper decanter, on the inside and/or outside thereof, in a manner such that adapter 30 will capture the lower end of the upper decanter to support it in the desired offset relation to the lower adjacent decanter.

In the above regard, a preferred configuration dimensionally for spacing between opposite ones of the downwardly projecting tabs 50 of the respective adapters of the invention will be so as to define and bound a lower, downwardly facing decanter receiver or receptacle for receiving and capturing and holding the upper end of the lower decanter in a manner to prevent significant relative lateral movement therebetween, and the spacing between the opposite upwardly projecting tabs 50 will be so as to define and bound an upper, upwardly facing upper decanter receiver or receptacle for receiving and capturing and holding the lower end of the upper decanter in a manner to prevent significant relative lateral movement therebetween, the downwardly and upwardly facing receptacles being offset laterally in a selected direction by the desired amount.

To securely hold the decanters, it is preferred that the downwardly and upwardly projecting tabs 50 be positioned to be in close proximity or abutting relation to adjacent upstanding surfaces of the associated decanters so that there will be very limited or no relative lateral movement allowed between the decanters when stacked.

Here it should be recognized that stacked decanters can present a tipping hazard if offset laterally too much or not sufficiently securely. To reduce or eliminate this hazard while still providing the desired or required offset relation, the extent of the offset in the desired direction, which can be forward or rearward (see e.g., FIGS. 11-18); angular (FIGS. 19-22); and sideward (FIGS. 23-26), is controlled to maintain the center of gravity of upper ones of the decanters safely in proximity laterally relative to the center of gravity of a lower one or ones of the decanters in a stack, namely, within the area of the downwardly facing receptacle of the associated adapter.

The center of gravity of each decanter will usually be at about its physical center, thus the extent of offset will ensure that the center of the upper decanter or decanters is/are well inside of the edges of the lower decanter or decanters in a stack. This can be observed by the approximate centers of gravity, denoted "CG" of the stacked decanters of FIGS. 12, 17, 20, and 24, it being understood that the centers of gravity of the respective decanters will vary elevationally with beverage level within the decanter. It is further contemplated that users may press downwardly on the faucet 40 or other dispensing apparatus when filling a container from a decanter, and this is considered when determining and limiting the extent of lateral offset.

It can be further observed that the forward downwardly projecting tab 50 on some embodiments have height dimensions so as to extend downwardly a greater distance than the other tabs 50 which will have smaller heights. This provides additional stability and protection against tipping.

As an additional feature when laterally offset as variously shown the upper end of the lower decanter or decanters can be exposed, and the adapters 30, 32, 34, and 36 can be optionally configured to enclose and act as lids for the lower decanters.

As an additional feature of the invention, any of the adapters 30, 32, 34, and 36 can include an optional brew through opening 52 (see FIGS. 6-10) to allow flow of the beverage into the associated decanter from a brewing apparatus located thereabove, in the well known manner.

As illustrated in FIG. 12 by drip lines 54, when stacked in laterally offset relation according to the invention, the drippings from a faucet 40 of an upper decanter 38 of a stack will not fall onto the faucet 40 of the lower decanter, thereby avoiding collection of beverage residue which can be sticky and present a sanitation problem. Some decanters 38 will have an outwardly projecting handle 56 on the same wall as faucet 40, which can also become soiled with dripped beverage, and the extent of offset can be set to prevent this occurrence also. It can also be observed in FIGS. 15-18 that with a desired lateral offset, the faucets of the stacked decanters 38 can all be located over a single drip pan 42 for collecting drippings.

As still another feature and advantage, the adapters 30, 32, 34, and 36 can be usable to laterally offset decanters in desired directions, including forward, rearward, left and right, and angularly within a wide range of angles, as desired for function or aesthetic appeal. As non-limiting examples, offset distances of up to several inches for standard commercially available decanters such as shown can be achieved using the adapters of the invention.

As still another feature, the adapters can be adjustable for example, as denoted by arrows 58 in FIGS. 3, 8, 22 and 26, to allow varying the offset distance within set ranges, including zero offset if desired. This can be accomplished for example, by using two panels 48 in overlaying relation, connected, e.g., by fasteners such as rivets, screws, or the like, to allow relative sliding or pivoting movement in a limited manner.

In light of all the foregoing, it should thus be apparent to those skilled in the art that there has been shown and described an adapter for offset stacking of beverage decanters. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An adapter to offset stack beverage decanters, comprising:
   a generally flat panel including a pattern of downwardly projecting tabs bounding and defining a downwardly facing receptacle having dimensions for receiving an upper end of a lower decanter, and a pattern of upwardly projecting tabs bounding and defining an upwardly facing receptacle having dimensions for receiving a lower end of an upper decanter, the pattern of the upwardly projecting tabs being laterally offset in a predetermined direction by a predetermined distance from the pattern of the downwardly projecting tabs such that the upper decanter will be laterally offset by the predetermined distance from the lower decanter when the lower decanter is received in the downwardly facing receptacle and the upper decanter is received in the upwardly facing receptacle to stack the decanters, and wherein each of the decanters has a faucet on a forward facing upstanding surface thereof, and the pattern of the upwardly projecting tabs is laterally offset from the pattern of the downwardly projecting tabs to offset the faucet of the upper decanter from the faucet of the lower decanter in a forward and rearward direction.

2. The adapter of claim 1, wherein the pattern of the upwardly projecting tabs is laterally offset from the pattern of the downwardly projecting tabs to angularly offset the faucet of the upper decanter from the faucet of the lower decanter.

3. The adapter of claim 1, wherein the pattern of the upwardly projecting tabs is laterally offset from the pattern of the downwardly projecting tabs to sidewardly offset the faucet of the upper decanter from the faucet of the lower decanter.

4. The adapter of claim 1, wherein each of the decanters has a center of gravity, and the predetermined distance is such that the center of gravity of the upper decanter will be located within an area bound by the downwardly facing receptacle.

5. The adapter of claim 1, wherein at least one of the upwardly projecting tabs on a forward peripheral edge of the panel has a height dimension greater than a height dimension of others of the upwardly projecting tabs.

6. The adapter of claim 1, wherein the panel has a brew through opening therethrough.

7. The adapter of claim 1, wherein the panel comprises laterally slidable portions including the downwardly projecting tabs and the upwardly projecting tabs, respectively, to enable varying the predetermined distance within set ranges.

8. The adapter of claim 1, wherein the panel is constructed of sheet metal.

9. The adapter of claim 1, wherein the panel is constructed of plastics.

10. An adapter supporting an upper beverage decanter in laterally offset relation to a lower beverage decanter, comprising:
   a generally flat panel including a pattern of downwardly projecting tabs bounding and defining a downwardly facing receptacle receiving an upper end of the lower decanter in a manner permitting no substantial lateral movement therebetween, and a pattern of upwardly projecting tabs bounding and defining an upwardly facing receptacle receiving a lower end of an upper decanter in a manner permitting no substantial lateral movement therebetween, the pattern of the upwardly projecting tabs being laterally offset in a predetermined direction by a predetermined distance from the pattern of the downwardly projecting tabs such that the upper decanter is laterally offset by the predetermined distance from the lower decanter, and each of the lower decanter and the upper decanter having a faucet on a forward facing upstanding surface thereof, and the pattern of the upwardly projecting tabs being laterally offset from the pattern of the downwardly projecting tabs to offset the faucet of the upper decanter from the faucet of the lower decanter in a forward and rearward direction.

11. The adapter of claim 10, wherein the pattern of the upwardly projecting tabs is laterally offset from the pattern of the downwardly projecting tabs to angularly offset the faucet of the upper decanter from the faucet of the lower decanter.

12. The adapter of claim 10, wherein the pattern of the upwardly projecting tabs is laterally offset from the pattern of the downwardly projecting tabs to sidewardly offset the faucet of the upper decanter from the faucet of the lower decanter.

13. The adapter of claim 10, wherein the each of the decanters has a center of gravity, and the predetermined distance is such that the center of gravity of the upper decanter is located within an area bound by the downwardly facing receptacle.

14. The adapter of claim 10, wherein at least one of the upwardly projecting tabs on a forward peripheral edge of the panel has a height dimension greater than a height dimension of others of the upwardly projecting tabs.

15. The adapter of claim 10, wherein the panel has a brew through opening therethrough.

16. The adapter of claim 10, wherein the panel comprises laterally slidable portions including the downwardly projecting tabs and the upwardly projecting tabs, respectively, to enable varying the predetermined distance within set ranges.

17. The adapter of claim 10, wherein the panel is constructed of sheet metal.

18. The adapter of claim 10, wherein the panel is constructed of plastics.

19. An adapter to offset stack beverage decanters, comprising:
a generally flat panel including a pattern of downwardly projecting tabs bounding and defining a downwardly facing receptacle having dimensions for receiving an upper end of a lower decanter, and a pattern of upwardly projecting tabs bounding and defining an upwardly facing receptacle having dimensions for receiving a lower end of an upper decanter, the pattern of upwardly projecting tabs being laterally offset in a predetermined direction by a predetermined distance from the pattern of downwardly projecting tabs such that the upper decanter will be laterally offset by the predetermined distance from the lower decanter when the lower decanter is received in the downwardly facing receptacle and the upper decanter is received in the upwardly facing receptacle to stack the decanters, and wherein the each of the decanters has a faucet on a forward facing upstanding surface thereof, and the pattern of the upwardly projecting tabs is laterally offset from the pattern of the downwardly projecting tabs to angularly offset the faucet of the upper decanter from the faucet of the lower decanter.

20. The adapter of claim 19, wherein the each of the decanters has a center of gravity, and the predetermined distance is such that the center of gravity of the upper decanter will be located within an area bound by the downwardly facing receptacle.

21. An adapter to offset stack beverage decanters, comprising:
a generally flat panel including a pattern of downwardly projecting tabs bounding and defining a downwardly facing receptacle having dimensions for receiving an upper end of a lower decanter, and a pattern of upwardly projecting tabs bounding and defining an upwardly facing receptacle having dimensions for receiving a lower end of an upper decanter, the pattern of upwardly projecting tabs being laterally offset in a predetermined direction by a predetermined distance from the pattern of downwardly projecting tabs such that the upper decanter will be laterally offset by the predetermined distance from the lower decanter when the lower decanter is received in the downwardly facing receptacle and the upper decanter is received in the upwardly facing receptacle to stack the decanters, and wherein the each of the decanters has a faucet on a forward facing upstanding surface thereof, and the pattern of the upwardly projecting tabs is laterally offset from the pattern of the downwardly projecting tabs to sidewardly offset the faucet of the upper decanter from the faucet of the lower decanter.

22. The adapter of claim 21, wherein the each of the decanters has a center of gravity, and the lateral offset distance is such that the center of gravity of the upper decanter will be located within an area bound by the downwardly facing receptacle.

23. An adapter to offset stack beverage decanters, comprising:
a generally flat panel including a pattern of downwardly projecting tabs bounding and defining a downwardly facing receptacle having dimensions for receiving an upper end of a lower decanter, and a pattern of upwardly projecting tabs bounding and defining an upwardly facing receptacle having dimensions for receiving a lower end of an upper decanter, the pattern of upwardly projecting tabs being laterally offset in a predetermined direction by a predetermined distance from the pattern of downwardly projecting tabs such that the upper decanter will be laterally offset by the predetermined distance from the lower decanter when the lower decanter is received in the downwardly facing receptacle and the upper decanter is received in the upwardly facing receptacle to stack the decanters, and wherein at least one of the upwardly projecting tabs on a forward peripheral edge of the panel has a height dimension greater than a height dimension of others of the upwardly projecting tabs.

24. An adapter to offset stack beverage decanters, comprising:
a generally flat panel including a pattern of downwardly projecting tabs bounding and defining a downwardly facing receptacle having dimensions for receiving an upper end of a lower decanter, and a pattern of upwardly projecting tabs bounding and defining an upwardly facing receptacle having dimensions for receiving a lower end of an upper decanter, the pattern of upwardly projecting tabs being laterally offset in a predetermined direction by a predetermined distance from the pattern of downwardly projecting tabs such that the upper decanter will be laterally offset by the predetermined distance from the lower decanter when the lower decanter is received in the downwardly facing receptacle and the upper decanter is received in the upwardly facing receptacle to stack the decanters, and wherein the panel has a brew through opening therethrough.

25. An adapter to offset stack beverage decanters, comprising:

a generally flat panel including a pattern of downwardly projecting tabs bounding and defining a downwardly facing receptacle having dimensions for receiving an upper end of a lower decanter, and a pattern of upwardly projecting tabs bounding and defining an upwardly facing receptacle having dimensions for receiving a lower end of an upper decanter, the pattern of upwardly projecting tabs being laterally offset in a predetermined direction by a predetermined distance from the pattern of downwardly projecting tabs such that the upper decanter will be laterally offset by the predetermined distance from the lower decanter when the lower decanter is received in the downwardly facing receptacle and the upper decanter is received in the upwardly facing receptacle to stack the decanters, and wherein the panel comprises laterally slidable portions including the downwardly projecting tabs and the upwardly projecting tabs, respectively, to enable varying the distance of the offset of the upper and lower decanters within set ranges.

* * * * *